E. A. LE BEAU.
BRAKE BEAM.
APPLICATION FILED JULY 6, 1909.
953,148.
Patented Mar. 29, 1910.
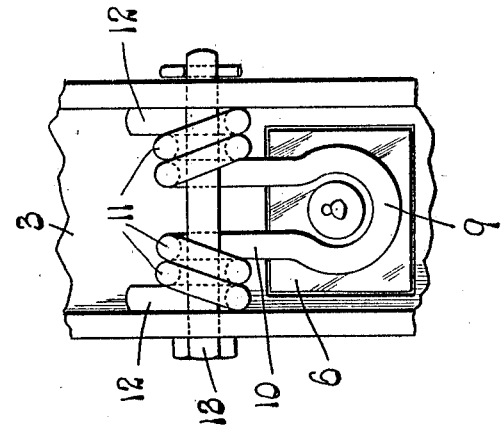
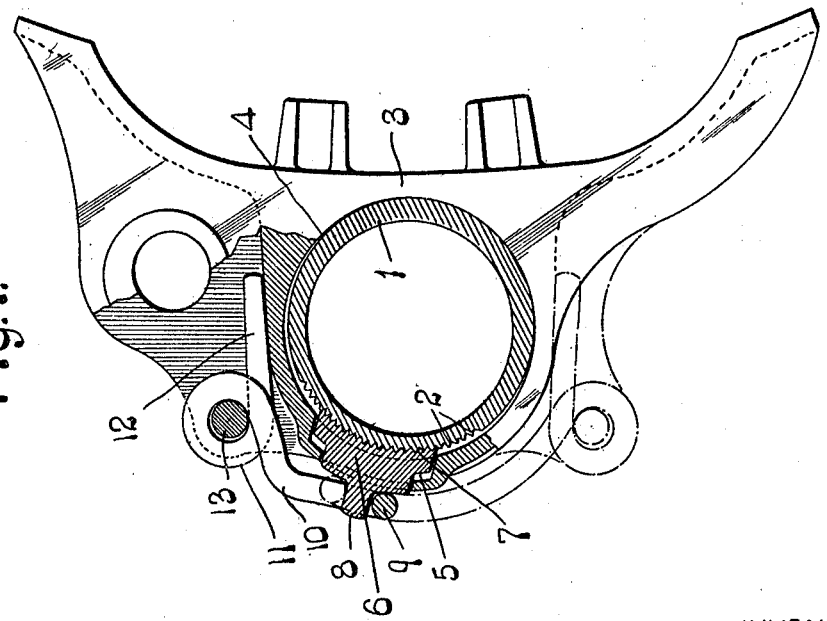
WITNESSES
INVENTOR
E. A. LE BEAU

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

953,148.   Specification of Letters Patent.   Patented Mar. 29, 1910.

Application filed July 6, 1909. Serial No. 506,046.

*To all whom it may concern:*

Be it known that I, ERNEST A. LE BEAU, a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a section taken through the body of the compression member of a beam of my improved construction, showing a portion of the brake head thereon in section. Fig. 2 is a rear elevation of the central portion of the head used on my improved beam.

My invention relates generally to brake beams of the type shown and described in the patent issued to Henry B. Robischung, November 8th, 1892, No. 485,823.

My invention relates particularly to the means employed for attaching the brake heads on the ends of the compression member of the beam, and the object of my invention is to effect such a combination of beam and brake head as that the head is automatically adjustable on the beam and held thereon after adjustment.

It has been demonstrated in practice, that while it is desirable that the brake head be capable of adjusting itself to the wheel when the brakes are applied, it is equally, if not more important that the head should be held on the beam after it has assumed its adjusted position, and which head should also be capable of being forced into a different position, should for any reason whatever the relative positions of the wheel and head be changed.

Another object of my invention is to so construct the locking block and its holding means that they occupy but little space, thus enabling the adjustable head to be used on inside hung beams.

To the above purposes, my invention consists in certain novel features of construction and arrangement of parts hereinafter more fully described and claimed.

Referring by numerals to the accompanying drawings, 1 designates the thrust block which is usually secured to the compression member of the beam, which thrust block is in the form of a spool, or sleeve, provided on its periphery with corrugations or teeth 2.

3 designates the brake head, which may be in any desired pattern adapted to receive any form of brake shoe, and said head is provided with a circular opening 4 in which the sleeve on the end of the compression member is seated.

Formed in the side of the head 3 is a recess or pocket 5 which is occupied by the main body portion of a gripping block 6, the inner face of which is curved to conform with the curvature of the surface of the sleeve 1, and said curved inner face of this block is corrugated or provided with teeth 7, in order to engage the corresponding teeth or corrugations 2.

Formed integral with the block 6 is a lug 8, and bearing on said block is a loop 9 forming part of a spring 10. A series of coils 11 formed in this spring give the required resiliency, and the ends 12 of said spring are extended in a plane approximately at right angles to the plane occupied by the loop 9, said ends resting upon the body of the head 3. The spring 10 is held in proper position on the head by means of a pin or bolt 13 which passes through suitable apertures formed in the flanges of said head and through the coils 11. In the present case, I have shown the spring as being located on the upper portion of the head, but in some instances it may be advantageous to locate the springs on the under side of the head, as shown by dotted lines in Fig. 1, or in some instances, a double spring or two springs may be utilized.

When a brake beam of my improved construction is in use, the loop 9 bears against the gripping block 6, holding the same firmly against the toothed or corrugated portion of the sleeve, and thereby rigidly maintaining the head in position on said sleeve. The head 3 will automatically adjust itself on the end of the beam when the brakes are set. After this automatic adjustment takes place, the gripping block, being in engagement with the corrugated portion of the sleeve, remains in its adjusted position. When it is desired to remove the head from the beam for the purpose of repair, the pin or bolt 13 is removed, thus releasing the spring 10, and the head is now free to be detached from its sleeve.

My improved brake beam is comparatively simple, comprises a minimum number of parts, is easily assembled or taken apart, and is equipped with simple means whereby the brake heads are automatically adjustable and are locked to the ends of the beam after adjustment, and further, the locking block consumes little space, thereby enabling the beam to be "inside" hung.

It is obvious that minor changes in the form and construction of my improved brake beam may be made without departing from the spirit of my invention.

I claim:

1. The combination with a brake beam, of brake heads, a yielding locking block, and a torsion spring coöperating therewith.

2. The combination with a brake beam, of a brake head having a recess opening to the exterior, a locking block arranged in said recess, and a spring arranged on the outside of the head and coöperating with said block through said opening.

3. The combination with a brake beam, of a movable brake head arranged on the end thereof, a locking block carried by the brake head and adapted to engage a part on the beam, and a spring removably carried by the brake head on the exterior thereof, which spring bears upon the locking block.

4. The combination with a brake beam, of a movable brake head arranged on the end thereof, a locking block carried by the brake head, the inner face of which locking block is corrugated and adapted to engage the surface of a part carried by the beam, and a spring removably carried by the brake head on the exterior thereof, which spring bears upon the locking block.

5. The combination with a brake beam, of a brake head loosely mounted on the end thereof, there being a recess formed in said brake head, a locking block occupying said recess, and a spring arranged on the exterior of the brake head and bearing against the locking block.

6. The combination with a brake beam, of a brake head loosely mounted on the end thereof, there being a recess formed in said brake head, a locking block occupying said recess, the bearing face of which locking block is corrugated, and a spring arranged on the exterior of the brake head and bearing against the locking block.

7. In a brake beam, a brake head provided with a socket adapted to receive the end of the brake beam, a locking block carried by the brake head, and a spring on the exterior of the brake head, which spring bears against the locking block.

8. In a brake beam of the class described, a brake head provided with a socket adapted to receive the end of the beam, a locking block carried by said head, a pin on the head, and a spring pivoted on said pin and bearing upon the locking block.

9. In a brake beam of the class described, a brake head provided with a socket adapted to receive the end of the beam, a locking block carried by said head, a pin on the head, and a spring pivotally mounted on said pin and bearing upon the locking block.

10. In a brake beam of the class described, a brake head having a socket, a shouldered recess for a locking block opening into said socket, a locking block loosely arranged in said recess, and an exteriorly arranged spring for pressing said block inwardly.

11. In a brake beam of the class described, a brake head having a socket, a shouldered recess for a locking block opening into said socket and to the exterior, a locking block loosely arranged in said recess, and an exteriorly arranged spring for pressing said block inwardly.

12. In a brake beam of the class described, a brake head having a socket and a locking recess which opens into said socket and to the exterior, said brake head having exteriorly arranged means adjacent to said locking lock recess for supporting a spring.

13. A locking block for brake beams having a corrugated face and a spring coöperating projection extending from its back.

14. A spring for holding a locking block in position on a brakehead, having a bent portion to engage the locking block, and other portions to engage the brake head.

15. A spring for holding a locking block in position on a brake head, said spring being bent to engage the locking block and the brake head, and being provided with proper means whereby it may be pivotally mounted on the brake head.

16. A spring for holding a locking block in position on a brake head, said spring being made of a single piece bent to engage the locking block and the brake head, and provided with loops to embrace a pivot rod.

In testimony whereof I hereunto affix my signature in the presence of two witnesses, this 26th day of June, 1909.

ERNEST A. LE BEAU.

Witnesses:
EDWARD T. WALKER,
JOSEPH W. WEINLAND.